(12) United States Patent
Kobayashi et al.

(10) Patent No.: US 7,874,733 B2
(45) Date of Patent: Jan. 25, 2011

(54) ROLLING BEARING

(75) Inventors: Takuji Kobayashi, Kuwana (JP); Masatsugu Mori, Kuwana (JP); Sun-woo Lee, Kuwana (JP); Hiroshi Takiuchi, Kuwana (JP)

(73) Assignee: NTN Corporation, Osaka (JP)

( * ) Notice: Subject to any disclaimer, the term of this patent is extended or adjusted under 35 U.S.C. 154(b) by 271 days.

(21) Appl. No.: 12/087,418

(22) PCT Filed: Dec. 5, 2006

(86) PCT No.: PCT/JP2006/324245

§ 371 (c)(1), (2), (4) Date: Jul. 3, 2008

(87) PCT Pub. No.: WO2007/077706

PCT Pub. Date: Jul. 12, 2007

(65) Prior Publication Data

US 2009/0103844 A1  Apr. 23, 2009

(30) Foreign Application Priority Data

Jan. 5, 2006 (JP) ............... 2006-000640
Jan. 19, 2006 (JP) ............... 2006-010682

(51) Int. Cl.
*F16C 19/00* (2006.01)

(52) U.S. Cl. ................................ 384/462

(58) Field of Classification Search .......... 384/462–475
See application file for complete search history.

(56) References Cited

U.S. PATENT DOCUMENTS 3,951,476 A * 4/1976 Schulien et al. ............. 384/385
4,571,097 A * 2/1986 Lee et al. ................... 384/469
4,576,489 A   3/1986 Bentele et al.
6,733,181 B2 * 5/2004 Koiwa et al. ................ 384/465

(Continued)

FOREIGN PATENT DOCUMENTS

JP      61-218829       9/1986

(Continued)

OTHER PUBLICATIONS

International Search Report mailed Jan. 16, 2007 in connection with the International Application No. PCT/JP2006/324245.

(Continued)

*Primary Examiner*—Thomas R Hannon
*Assistant Examiner*—James Pilkington

(57) ABSTRACT

To provide a rolling bearing assembly, in which a grease filled within the bearing assembly is utilized to achieve a high speed feature, a long life and a maintenance-free and a lubricant oil can be stably supplied from a minute gap, a stepped face continued from the raceway surface is provided in a stationary raceway ring unit of an inner and outer ring units in a direction away from rolling elements. A gap forming piece having a free end confronting the stepped face is provided to define therebetween a flow passage and a grease reservoir communicated with the flow passage. The rolling bearing assembly is so designed that a heat cycle can be induced in the grease reservoir and, base oil of the grease can be urged to flow out from the gap by the effect of a pressure variation caused by the temperature rise.

8 Claims, 10 Drawing Sheets

U.S. PATENT DOCUMENTS

| | | | |
|---|---|---|---|
| 7,293,919 B2 * | 11/2007 | Ueno et al. | 384/473 |
| 7,500,311 B2 * | 3/2009 | Shimomura | 29/898.1 |
| 2006/0239598 A1 | 10/2006 | Matsuyama et al. | |
| 2009/0034892 A1 * | 2/2009 | Akamatsu et al. | 384/473 |

FOREIGN PATENT DOCUMENTS

| | | |
|---|---|---|
| JP | 62-106126 | 5/1987 |
| JP | 63-180726 | 11/1988 |
| JP | 2-80815 | 3/1990 |
| JP | 5-22850 | 3/1993 |
| JP | 5-45246 | 6/1993 |
| JP | 6-35657 | 5/1994 |
| JP | 6-73450 | 10/1994 |
| JP | 08-338426 | 12/1996 |
| JP | 10-184705 | 7/1998 |
| JP | 11-108068 | 4/1999 |
| JP | 2000-288870 | 10/2000 |
| JP | 2003-113998 | 4/2003 |
| JP | 2004-225807 | 8/2004 |
| JP | 2004-330406 | 11/2004 |
| JP | 2005-106245 | 4/2005 |
| JP | 2005-180629 | 7/2005 |
| JP | 2005-201346 | 7/2005 |
| JP | 2005-221042 | 8/2005 |

OTHER PUBLICATIONS

International Preliminary Report on Patentability, mailed Jul. 17, 2008 and issued in corresponding International Patent Application No. PCT/JP2006/324245.

Japanese Patent Office Action, mailed Apr. 22, 2008 and issued in corresponding Japanese Patent Application No. 2006-000640.

U.S. Office Action mailed Jun. 18, 2010 in related U.S. Appl. 11/664,778.

U.S. Office Action dated Sep. 27, 2010 issued in related U.S. Appl. No. 11/664,778.

Chinese Office Action mailed Sep. 17, 2010 in corresponding Chinese Patent Application 200910146368.8.

* cited by examiner

ROLLING BEARING

This application claims the benefit under 35 U.S.C. Section 371, of PCT International Application Number PCT/JP2006/324245 filed Dec. 5, 2006, which claimed priority to Japanese Application No. 2006-000640 filed Jan. 5, 2006 and Japanese Application No. 2006-010682 filed Jan. 19, 2006 in Japan, the contents of which are incorporated herein by reference.

BACKGROUND OF THE INVENTION

1. Field of the Invention

The present invention relates to a rolling bearing assembly having a lubricating function for lubricating a work machine spindle or the like with a grease.

2. Description of the Prior Art

The lubricating method for lubricating bearing assemblies for a spindle used in a work machine is well known, which includes a grease lubrication that can be utilized maintenance-free, an air oil lubrication for spraying a lubricant carrier air, mixed with a lubricant oil, into bearings through a nozzle, and a jet lubrication for jetting a lubricant oil directly into bearings. Machine tools used in these days are getting utilized in a high speed environment with an aim at increasing the processing efficiency and the air oil lubricating technique has come to be largely used as it can afford a relatively inexpensive and fast lubrication for the spindle bearings. However, this air oil lubricating technique requires the use of an air oil supplying equipment as an incidental equipment and is therefore considered involving such a problem as associated with cost, noise, energy saving and resource saving. In addition, the air oil lubricating technique involves an additional problem in that the environment may be contaminated as a result of scattering of oil used therein. In order to alleviate these problems, a high speed orientation through the use of the grease lubrication is recently getting highlighted and is increasingly desired for.

Since the grease lubrication is accomplished solely with a grease filled during assemblage of the bearing assembly, it is considered that a high speed operation would result in a premature seizure because of deterioration of the grease under the influence of heat evolving in the bearing assembly and/or the lack of oil films in raceway surfaces, particularly the inner ring. Specifically, in a region of high speed revolution, in which the dn value exceeds 1,000,000 (bearing inner diameter (mm)×number of revolutions (rpm)), it is indeed difficult to ensure a grease operating life.

Some suggestions have been made to increase the grease operating life. One of them is the use of a grease reservoir in an outer ring raceway surface portion to ensure a long life at a high speed environment. (See, for example, the Japanese Laid-open Patent Publication No. H11-108068, published Apr. 20, 1999.) Another one of the suggestions is the use of a grease supply device provided outside a spindle so that a lubricant oil can be suitably supplied from such supply device to bearings. (See, for example, the Japanese Laid-open Patent Publication No. 2003-113998, published Apr. 18, 2003.)

It has, however, been found that the techniques hitherto suggested as hereinabove discussed are not considered satisfactory in respect of the number of revolutions used which is comparable with that in the air oil lubrication (dn value of more than 1.5 million), and/or the maintenance-free.

In view of the foregoing, the technique disclosed in the Japanese Laid-open Patent Publication No. H11-108068 is advanced in such a way that an axially extending minute gap is formed so as to communicate between a grease reservoir, which is defined in proximity to a stationary raceway ring (for example, an outer ring), and a portion in proximity to a raceway surface defined in the stationary raceway ring, a base oil within the grease reservoir is transferred to an area proximate to the raceway ring by the effect of a thickening agent and a capillary phenomenon occurring within the axially extending gap and then retained by the effect of a surface tension, and the base oil is eventually discharged, by the effects of a volumetric expansion of the base oil, which is caused as a result of an increase of the temperature in the axially extending gap during the operation, and of an airflow induced by a rotation of a rotatable raceway ring, so that the base oil is deposited on the raceway surface.

It has, however, been found that the system, in which the base oil is transferred to the axially extending gap by the effect of only the thickening agent and the capillary phenomenon taking place within the axially extending gap, does not give rise to a sufficient capability of transferring the base oil and, therefore, lubrication of the bearing assembly is not always sufficient.

SUMMARY OF THE INVENTION

The present invention has for its primary object to eliminating those problems discussed above and is intended to provide a rolling bearing assembly, in which only the grease filled within the bearing assembly is utilized to achieve a high speed feature, a long life and a maintenance-free and in which a discharge of a lubricant oil from the minute gap is ensured to enable a stabilized supply of the lubricant oil.

A rolling bearing assembly of the present invention includes an inner ring unit forming a raceway ring unit; an outer ring unit forming another raceway ring unit; a plurality of rolling elements interposed between respective raceway surfaces of the inner and outer ring units; a stepped face continued from the raceway surface provided in one of the inner ring unit and the outer ring unit that serves as a stationary raceway ring unit, in a direction away from the rolling elements; a gap forming piece having a free end confronting the stepped face to define a gap therebetween, and a peripheral wall cooperating with the stationary raceway ring unit to define a flow passage therebetween; and a grease reservoir communicated with the flow passage and subjected to a heat cycle of ascent and descent of a temperature. Preferably, the gap between the stepped face and the free end of the gap forming piece is chosen to be preferably within the range of 0.05 to 0.1 mm.

The rolling bearing assembly of the structure described above is used with a grease filled in the grease reservoir and the flow passage formed between the stepped face in the stationary raceway ring and the gap forming piece. When the temperature of the grease reservoir increases as the rolling bearing assembly is operated, due to the difference in coefficient of expansion between a thickening agent and a base oil within the sealed grease reservoir, the base oil is separated from the thickening agent. Simultaneously therewith, by the effect of a variation in pressure within the grease reservoir resulting from the heat cycle of ascent and descend of the temperature of the grease reservoir, the base oil separated from the thickening agent is assuredly transferred to the gap and is then purged towards the raceway surface. In addition, an effect is brought by a surface tension and a capillary phenomenon occurring in the gap and, therefore, the reliability of the lubricant oil being discharged can be increased further. In this way, only the grease filled within the bearing assembly is utilized to achieve a high speed feature, a long life, a maintenance-free and a stabilized supply of the lubricant oil.

In the present invention, the rolling bearing assembly referred to above may include a grease reservoir cooling liquid recirculating passage, through which a cooling liquid for cooling a member in contact with the stationary raceway ring unit is recirculated around the grease reservoir, so that the heat cycle of ascent and descent of the temperature can be applied to the grease reservoir generated by a time-dependent change of an amount of the cooling liquid flowing through the grease reservoir cooling liquid recirculating passage. Also, the stationary raceway ring may be, for example, the outer ring and the member in contact with the stationary raceway ring unit may be a housing accommodating the outer ring.

The rolling bearing assembly of the above described structure is used with the grease filled in the grease reservoir. As an oil for initial lubrication, the grease is suitably applied to the bearing raceway surface. When a machine such as, for example, a machine tool utilizing this rolling bearing assembly is operated, the base oil separated from the grease as a result of increase of the temperature and the pressure within the sealed grease reservoir can be urged to flow onto the raceway surface through the gap defined between the stepped face and the gap forming piece. In addition, an effect is brought by a surface tension and a capillary phenomenon occurring in the gap and, therefore, the base oil can be discharged onto the outer ring raceway surface by those effects and, accordingly, lubrication can be further assured. At this time, even when there is no cycle of operation/halt of the machine utilizing the bearing assembly and the machine is in a condition operated continuously, owning to the grease reservoir cooling liquid recirculating passage, the flow of the cooling liquid to be recirculated around the grease reservoir is interrupted to apply positively a heat cycle of ascent and descent of the temperature to the grease reservoir. In this way, the operation in which as a result of the pressure variation the base oil separated from the grease can be discharged onto the outer ring raceway surface through the gap can be repeated. For this reason, the supply of the lubricant oil can be carried out further assuredly. Thus, even under the continued operation for a long time, only the grease filled within the bearing assembly is utilized to achieve a high speed feature, a long life, a maintenance-free and a stabilized supply of the lubricant oil.

In the present invention, the rolling bearing assembly referred to above may be an angular contact ball bearing for supporting a machine tool spindle. In the case of the angular contact ball bearing, the stepped face can easily be defined immediately below the rolling elements when such stepped face is arranged on one side opposite to the direction in which the contact angle occurs. Since the stepped face can be positioned in proximity to the geometric center of each of the rolling elements, supply of the lubricant oil from the stepped face to the raceway surface can be carried out efficiently.

In the present invention, the rolling bearing assembly referred to above may be either a cylindrical roller bearing or a tapered roller bearing that is used to support the machine tool spindle.

A method of using the rolling bearing assembly of the present invention is a method for the rolling bearing assembly that includes an inner ring unit forming a raceway ring unit; an outer ring unit forming another raceway ring unit; a plurality of rolling elements interposed between respective raceway surfaces of the inner and outer ring units; a stepped face continued from the raceway surface provided in one of the inner ring unit and the outer ring unit that serves as a stationary raceway ring unit, in a direction away from the rolling elements; a gap forming piece having a free end confronting the stepped face to define a gap therebetween selected to be within the range of 0.05 to 0.1 mm, and a peripheral wall cooperating with the stationary raceway ring unit to define a flow passage therebetween; and a grease reservoir communicated with the flow passage. The method includes using the rolling assembly under an environment in which a heat cycle of ascent and descent of a temperature is applied to the grease reservoir. According to this using method, the grease is filled in the grease reservoir and the flow passage formed between the stepped face in the stationary raceway ring and the gap forming piece and, when the temperature of the grease reservoir increases as the bearing assembly is operated, due to the difference in coefficient of expansion between the thickening agent and the base oil within the sealed grease reservoir, the base oil is separated from the thickening agent. Simultaneously therewith, by the effect of a variation in pressure within the grease reservoir resulting from the heat cycle of ascent and descend of the temperature of the grease reservoir, the base oil separated from the thickening agent is assuredly transferred to the gap and is then purged towards the raceway surface. In addition, an effect is brought by a surface tension and a capillary phenomenon occurring in the gap and, therefore, the reliability of the lubricant oil being discharged can be increased further. In this way, only the grease filled within the bearing assembly is utilized to achieve a high speed feature, a long life, a maintenance-free and a stabilized supply of the lubricant oil.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
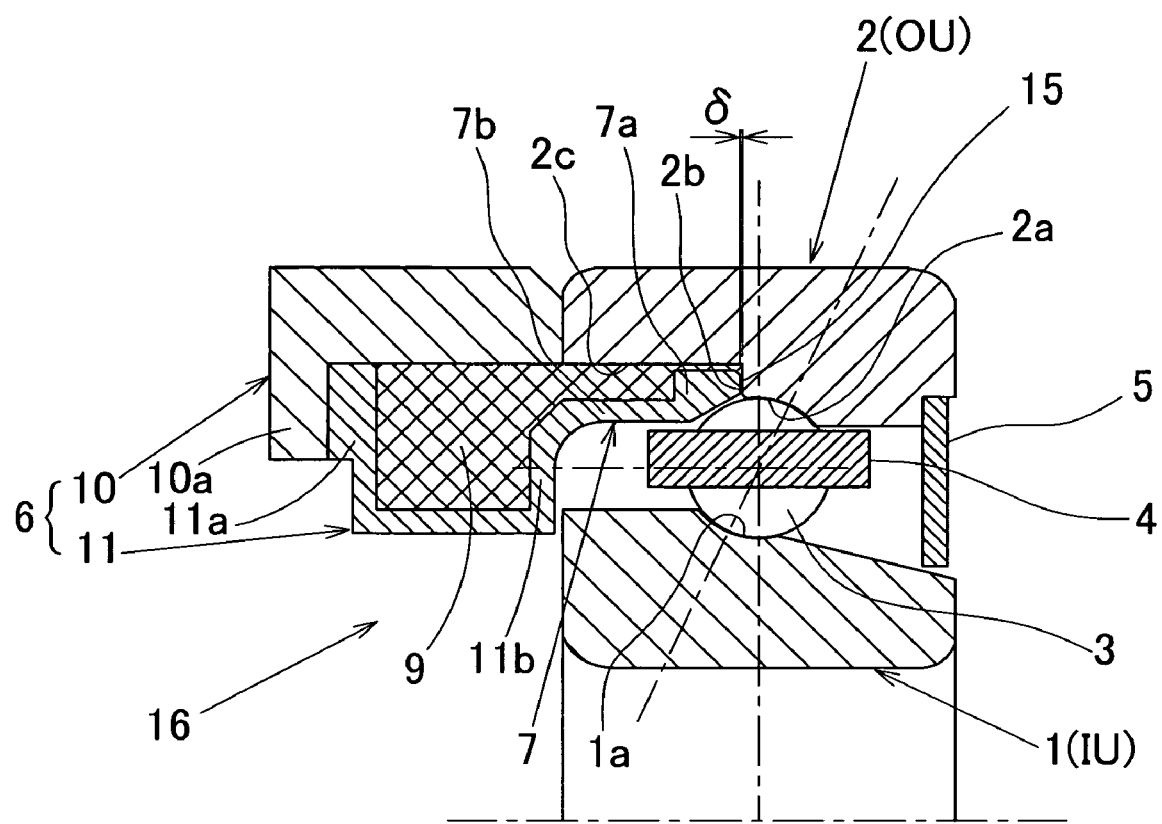
FIG. 1 is a fragmentary longitudinal sectional view of a portion of a rolling bearing assembly according to a first preferred embodiment of the present invention.

A first preferred embodiment of the present invention will be described with particular reference to FIGS. 1 to 3. Referring now to FIG. 1, a rolling bearing assembly shown therein includes an inner ring unit (IU) in the form of an inner ring 1, an outer ring unit (OU) in the form of an outer ring 2, and a plurality of rolling elements 3 interposed between raceway surfaces 1a and 2a defined in the inner and outer rings 1 and 2, respectively, a grease reservoir forming component unit 6 and a gap forming piece 7. The plural rolling elements 3 are retained by a retainer 4, and one of opposite ends of a bearing space delimited between the inner and outer rings 1 and 2 are sealed by a sealing member 5. The sealing member 5 is effective to avoid a leakage of a grease, filled inside the bearing assembly, to the outside. This rolling bearing assembly is an angular contact ball bearing, in which the sealing member 5 is provided in an end on a rear side of the bearing assembly and the grease reservoir forming component unit 6 and the gap forming piece 7 are provided on a front side of the bearing assembly. On the front side of the bearing assembly, the grease reservoir forming component unit 6 concurrently serves as a sealing element effective to avoid a leakage of the grease from the front side of the bearing assembly. A portion of the figure shown by the cross hatching represents an area where the grease is filled.

The outer ring 2, which forms a stationary raceway ring unit, has a stepped face 2b continued from a raceway surface 2a of the outer ring 2 and in continuation with an edge portion of the raceway surface 2a on one side opposite to the direction, in which the contact angle occurs, that is, on the outer ring front side remote from the rolling elements. This stepped face 2b is a face extending radially outwardly from the raceway surface 2a so as to oppose to the outer ring front side and continued to an inner diametric portion 2c on the front side of the outer ring 2.

The grease reservoir forming component unit 6 is a ring shaped component unit having a grease reservoir 9 defined therein and is provided in contact with an end face on the front side of the outer ring 2. In the instance as shown, the grease reservoir forming component unit 6 is made up of an outer ring positioning spacer 10, provided in contact with the end face on the front side of the outer ring 2, and a grease reservoir forming component body 11 of an outwardly oriented groove shape mounted on an inner diametric surface of the outer ring positioning spacer 10. An interior space delimited between the outer ring positioning spacer 10 and the grease reservoir forming component body 11 forms the grease reservoir 9. The outer ring positioning spacer 10 has a side wall portion 10a at one end of an inner diametric surface thereof remote from the outer ring 2, to which a side wall portion 11a of the grease reservoir forming component body 11 abuts. The grease reservoir forming component body 11 is positioned axially relative to the outer ring positioning spacer 10 when after a grease has been sealed within the grease reservoir 9, the side wall portion 11a is brought into abutment with an inner side of the side wall portion 10a of the outer ring positioning spacer 10.

A sealing member (not shown) is interposed between an outer diametric surface of the side wall portion 11a of the grease reservoir forming component body 11 and the inner diametric surface of the outer ring positioning spacer 10 that is opposed thereto. Alternatively, the grease reservoir forming component body 11 and the outer ring positioning spacer 10 may be bonded together by the use of a bonding agent. Another sealing member (also not shown) is interposed between respective mating faces of the outer ring positioning spacer 10 and the outer ring 2. Prevention of a grease leakage is accomplished by those sealing members.

Figure 2:
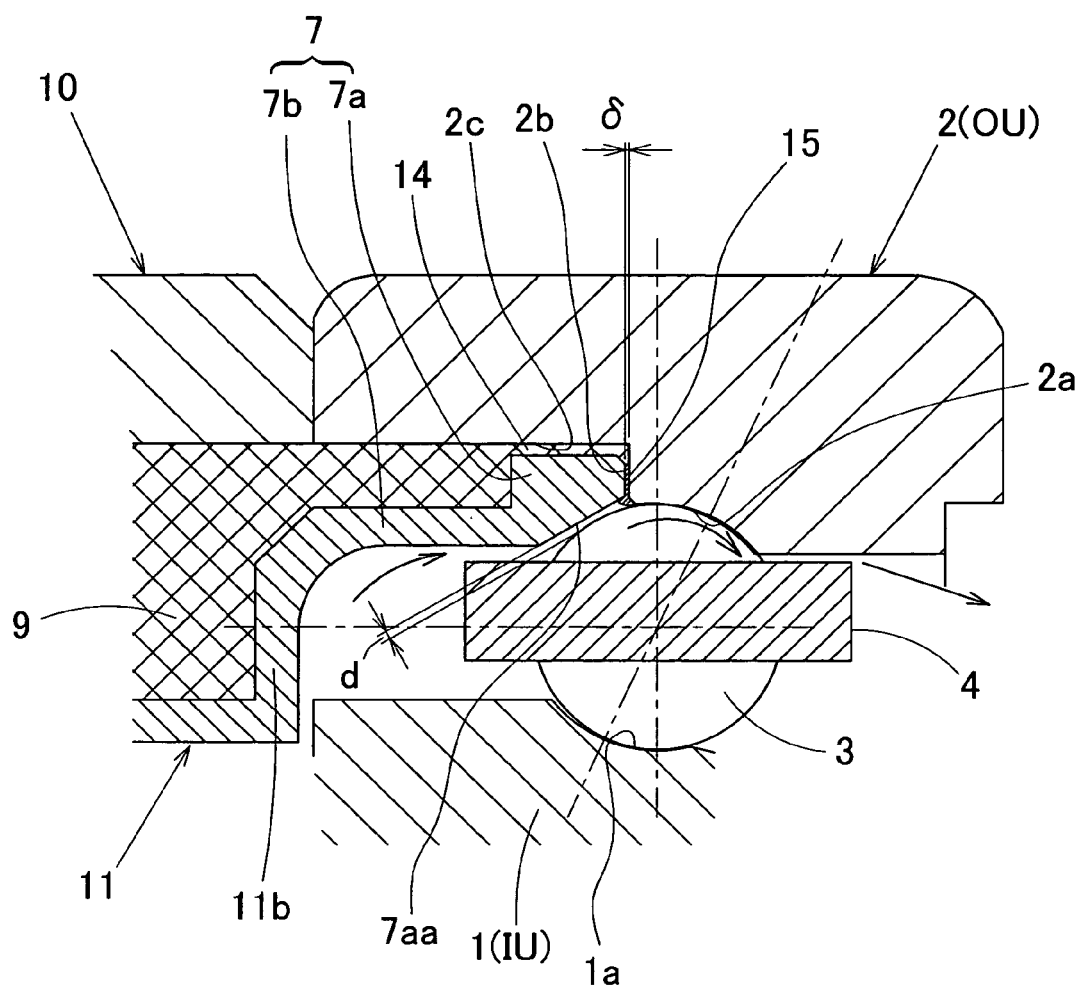
FIG. 2 is a fragmentary enlarged sectional view of that portion of the rolling bearing assembly shown in FIG. 1.

The gap forming piece 7 is a ring shaped member that is disposed along the inner diametric portion 2c of the outer ring 2, with its free end confronting the stepped face 2b, to thereby form a flow passage 14 and a gap 15 between the gap forming piece 7 and the outer ring 2 as shown on an enlarged scale in FIG. 2. This gap forming piece 7 is formed integrally with the grease reservoir component body 11. Specifically, the gap forming piece 7 extends integrally from an outer diametric end portion of the grease reservoir forming component body 11 adjacent the side wall portion 11b on one side adjacent the bearing.

Specifically, a peripheral wall of the free end 7a of the gap forming piece 7 and the inner diametric portion 2c of the outer ring 2 cooperatively define therebetween the flow passage 14 referred to above. The gap forming piece 7 has its free end 7a extending to a position proximate to the stepped face 2a of the outer ring 2 with the minute gap 15 of a gap size 6 defined between an end face of the free end 7a of the gap forming piece and the outer ring stepped face 2b to which the free end 7a confronts. This minute gap 15 is communicated with the flow passage 14 and opens at an edge portion of the outer ring raceway surface 2a. The gap size δ of the minute gap 15 is chosen to be within the range of 0.05 to 0.1 mm.

An inner diametric surface of the gap forming piece free end 7a that continues from the end face thereof is rendered to be a tapered face 7aa held in proximity to the rolling elements 3 to permit a lubricant oil to be readily pooled between the tapered face 7aa and the rolling elements 3. The tapered face 7aa and the rolling elements 3 are spaced a distance d from each other, which distance d is preferably of a size enough to define an extremely minute gap sufficient to allow the oil, then deposited to the tapered face 7aa, to be transferred to a surface of each of the rolling elements 3 and is so chosen as to be 0.2 mm or smaller. A base portion 7b of the gap forming piece 7 is designed to be of a diameter smaller than that of the free end 7a. An area delimited between an outer diametric surface of the base portion 7b and the inner diametric portion of the outer ring 2 forms a portion of the grease reservoir 9 that is communicated with the flow passage 14.

The operation of the structure described above will now be described. At the time of assemblage of the bearing assembly, a quantity of grease is filled in the grease reservoir 9 and the flow passage 14. As an oil for initial lubrication, the grease is also filled in the bearing assembly. The rolling bearing assembly is assumed to be used under an environment, in which the grease reservoir 9 is subjected to a heat cycle of ascent and descent of the temperature. This heat cycle occurs at intervals of preferably 30 minutes to 50 hours and more preferably 2 to 10 hours.

As the bearing assembly is operated, the grease pooled within the grease reservoir 9, that is sealed except at the gap 14, is subjected to separation between a base oil and a thickening agent, both of which are contents of the grease and have different coefficients of thermal expansion, as a result of temperature rise during the operation of the bearing assembly. Simultaneously therewith, an internal pressure of the sealed grease reservoir 9 increases and, by the effect of this internal pressure, the base oil separated from the thickening agent is discharged from the gap 14 towards the raceway surface 2a of the outer ring 2. When the temperature being raised attains a steady state, a decisive factor that has caused the ascent of the internal pressure diminishes and, therefore, the internal pressure gradually decreases as the base oil is so discharged, accompanied by a reduction in amount of the base oil discharged per unit time. When the operation of the bearing assembly is subsequently halted, the temperature within the grease reservoir 9 decreases, allowing the internal pressure within the grease reservoir 9 to come to be equal to the atmospheric pressure. At this time, no discharge of the base oil under the influence of the pressure causes and the base oil is filled within the gap 15. Accordingly, at the time the operation is halted, the grease reservoir 9 is held in a sealed state.

When the bearing assembly is again operated, the internal pressure within the grease reservoir 9 again increases. Thus, by the effect of the heat cycle accompanied by the cyclic ascent and descend of the temperature, a pressure variation is repeated within the grease reservoir 9 and the base oil separated from the grease is assuredly transferred to the gap 14 so that the base oil can be repeatedly supplied to the raceway surface 2a of the outer ring 2.

Additionally to the base oil discharge caused by the heat cycle as described above, a similar base oil discharge occurs by the effect of a capillary phenomenon as will now be described subsequently. Specifically, at the time bearing assembly is out of operation, the base oil of the grease moves from the flow passage 14 towards the gap 15 by the effect of the thickening agent and the capillary phenomenon taking place within the gap 15, and the base oil so supplied into the gap 15 in the manner described above is retained in an oil form within the gap 15 by the effect of the capillary phenomenon and the surface tension of the oil. When the bearing assembly is operated, the base oil pooled within the gap 15 is discharged from the gap 15 by the effect of a volumetric expansion caused by an increase of the temperature of the outer ring 2 brought about by the operation, and an airflow generated by revolution and rotation of the rolling elements 3, finally depositing on the raceway surface 2a of the outer ring, whereby the base oil deposited on the raceway surface 2 can be continuously transferred onto the rolling elements then held in rolling contact with the raceway surface 2.

As hereinabove described, in the rolling bearing assembly of the present invention, due to the pressure variation brought about by the heat cycle within the grease reservoir 9 as a result of the repetition of operation and halt of the bearing assembly, the base oil separated from the grease can be discharged to the raceway surface 2a of the outer ring 2 through the gap 15 and, therefore, the supply of the lubricant oil takes place assuredly. In addition, since the base oil can be discharged to the raceway surface 2a of the outer ring 2 also by the capillary phenomenon taking place within the gap 15 in the manner as hereinabove described, the lubricant can be supplied further assuredly. In view of this, only the grease filled within the bearing assembly is utilized to achieve a high speed feature, a long life, a maintenance-free and a stabilized supply of the lubricant oil.

In the case of the above described embodiment, since the rolling bearing assembly is shown as employed in the form of the angular contact ball bearing, when the stepped face 2b in the outer ring 2 is provided on one side opposite to the direction in which the contact angle occurs, the stepped face 2b can easily be arranged immediately below the rolling elements 3. Since the stepped face 2b can be positioned in proximity to the center of each of the rolling elements 3, supply of the lubricant oil from the stepped face 2b to the outer ring raceway surface 2a can be accomplished efficiently.

Figure 3:
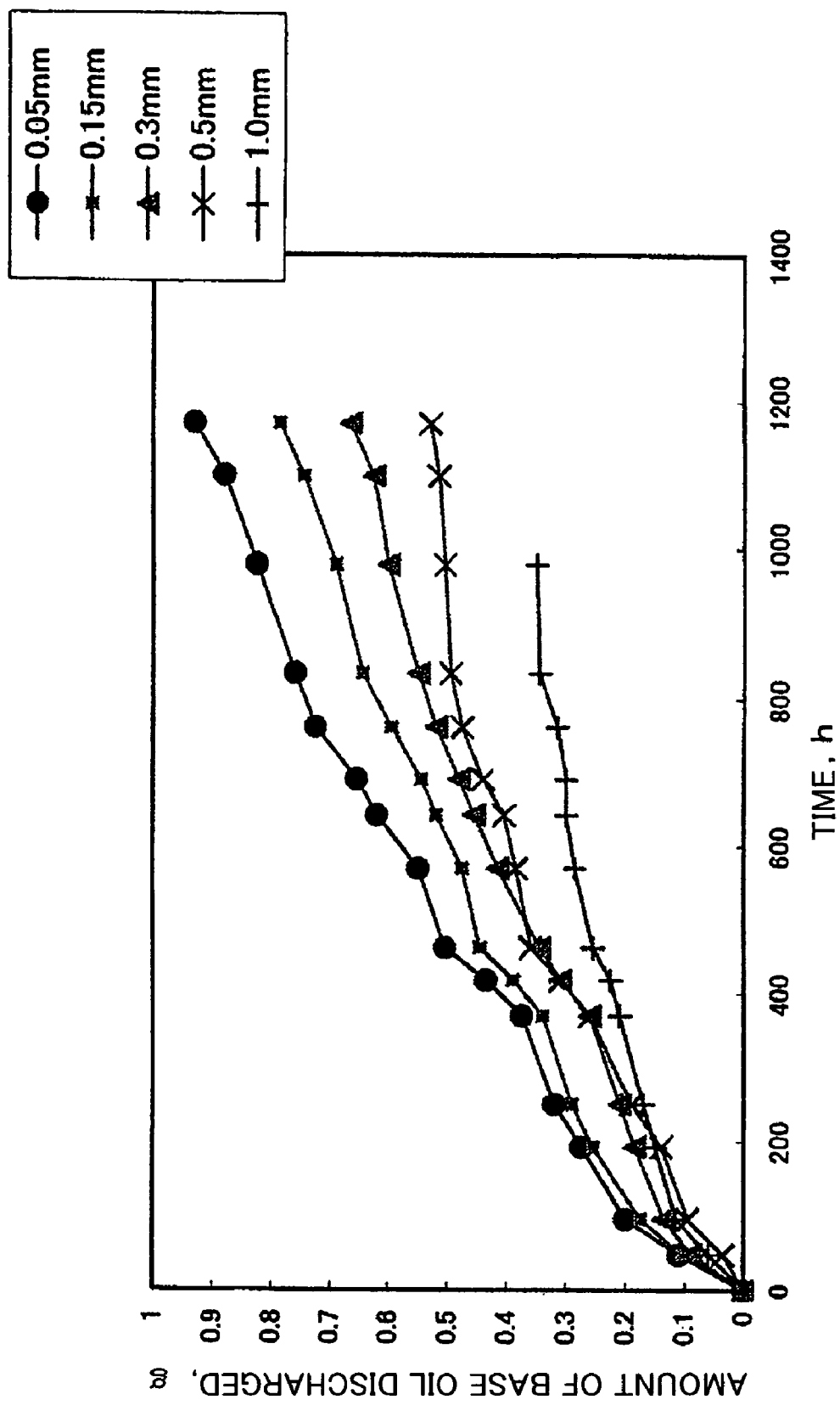
FIG. 3 is a chart showing results of experiments conducted to measure the amount of a base oil discharged from a gap when in a test model device simulating the rolling bearing assembly shown in FIG. 1, the gap defined between an outer ring stepped face and a free end of a gap forming piece is set to have one of a plurality of gap sizes.

FIG. 3 shows a chart showing results of experiments conducted to measure the amount of the base oil discharged from the gap 15 when in a test model device simulating the rolling bearing assembly according to the foregoing embodiment, the gap 15 in the rolling bearing assembly is chosen to have a gap size δ which is within the range of 0.05 to 0.1 mm. The results of the experiments clearly make it certain that so long as the gap size δ is within the range of 0.05 to 0.1 mm, the smaller the gap size δ, the larger the amount of the base oil discharged. However, considering the workability of the practice involving the processing of the gap 15 and the adjustment of the gap size δ, it can be determined that the gap size δ should be within the range of 0.05 to 0.1 mm.

Figure 4:
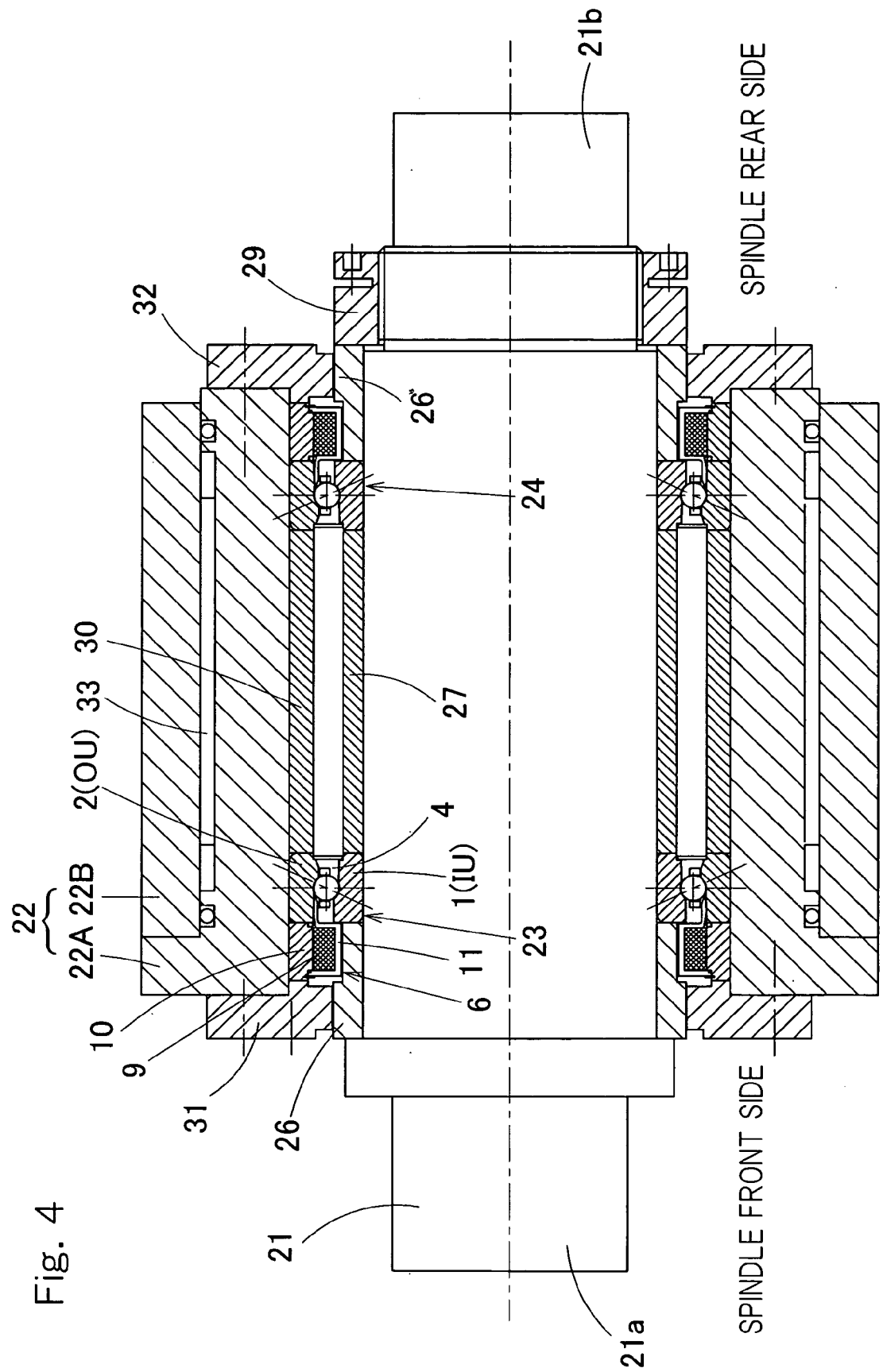
FIG. 4 is a longitudinal sectional view of a machine tool spindle device utilizing the rolling bearing assemblies shown in FIG. 1.

FIG. 4 illustrates an example of a machine tool spindle device employing the rolling bearing assemblies according to the first embodiment described hereinabove. In this machine tool spindle device, the two rolling bearing assembly are employed in back-to-back relation to each other. Those rolling bearing assemblies 23 and 24 are used to rotatably support a spindle 21 at opposite ends thereof within a housing 22. Each of the rolling bearing assemblies 23 and 24 has an inner ring 1 positioned intermediate between an inner ring positioning spacer 26 and an inner ring spacer 27 and is held in position on the spindle 21 by means of an inner ring fastening nut 29. An outer ring 2 of each of the rolling bearing assemblies 23 and 24 is fixedly positioned within the housing 22 by means of an outer ring positioning spacer 10, an outer ring spacer 30 and outer ring retaining lids 31 and 32. The housing 22 is made up of a housing inner tube 22A and a housing outer tube 22B mounted on the housing inner tube 22A with an oil flow groove 33 defined therebetween for cooling purpose.

The spindle 21 has a front end 21a, provided with a chuck (not shown) to which a tool or work (both not shown) can be detachably fitted, and a rear end 21b coupled with a drive source such as, for example, a motor or the like through a drive transmitting mechanism (not shown). The motor may be built in the housing 22. This spindle device is applied to any type of machine tools such as, for example, a machining center, lather, milling cutter, grinding machine and so on.

According to the spindle device of the structure described above, functions including a stabilized supply of the lubricant oil to the rolling bearing assemblies 23 and 24 according to this embodiment, high speed feature, increased life and maintenance-free can be exhibited effectively.

Figure 5:
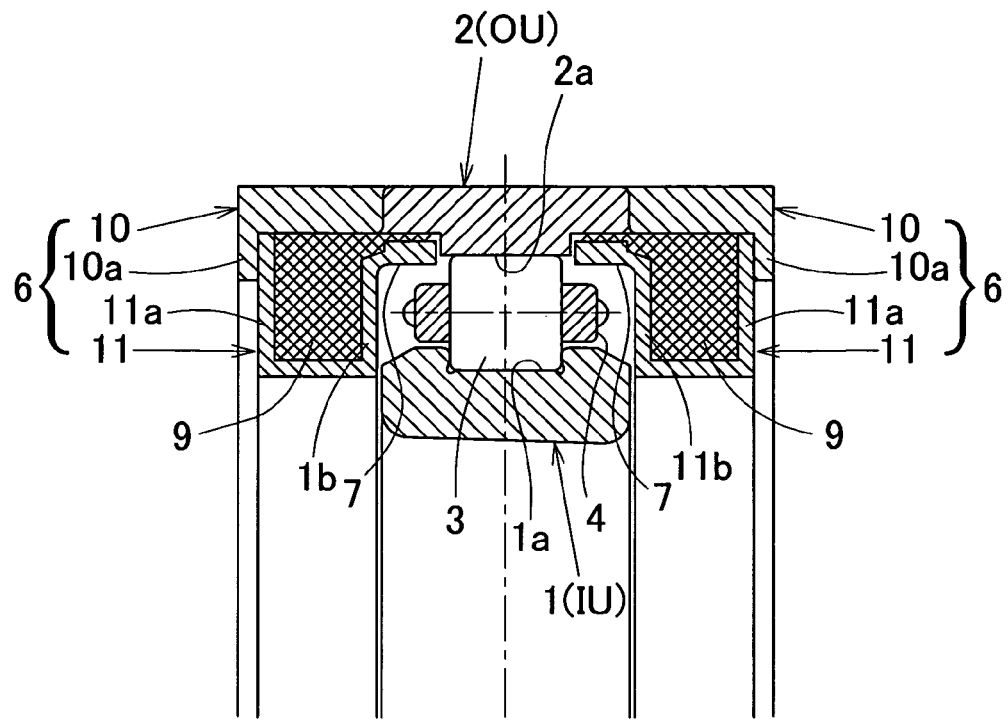
FIG. 5 is a fragmentary sectional view of the rolling bearing assembly according to a second preferred embodiment of the present invention.

FIG. 5 illustrates a second preferred embodiment of the present invention. This second embodiment is similar to the first embodiment, but differs therefrom in that the grease reservoir forming component unit 6 and the associated structural elements all employed in the first embodiment shown in FIGS. 1 and 2 are applied to a cylindrical roller bearing assembly. The grease reservoir forming component unit 6 is provided in respective areas proximate to opposite ends of the outer ring 2. Other structural features than those described above are similar to those employed in the first embodiment shown in and described with particular reference to FIGS. 1 and 2.

In the case of this second embodiment, the base oil of the grease can be supplied to the outer ring raceway surface 2a from the grease reservoir 9 defined on each side thereof. In the case of the cylindrical roller bearing assembly, since each of rollers forming the rolling elements 3 has a certain length, supply of the base oil of the grease from opposite sides is desirable in terms of increase in lubricity by supplying the base oil axially with no bias or irregularity in supply. Accordingly, a high speed feature, a long life and a maintenance-free can be enhanced. Even the cylindrical roller bearing assembly can be utilized in supporting the spindle of the machine tool spindle device in a manner similar to that shown and described in connection with the angular contact ball bearing in the first embodiment shown in FIGS. 1 and 2 to achieve the stabilized supply of the lubricant oil, the high speed feature, the long life and the maintenance-free.

Figure 6:
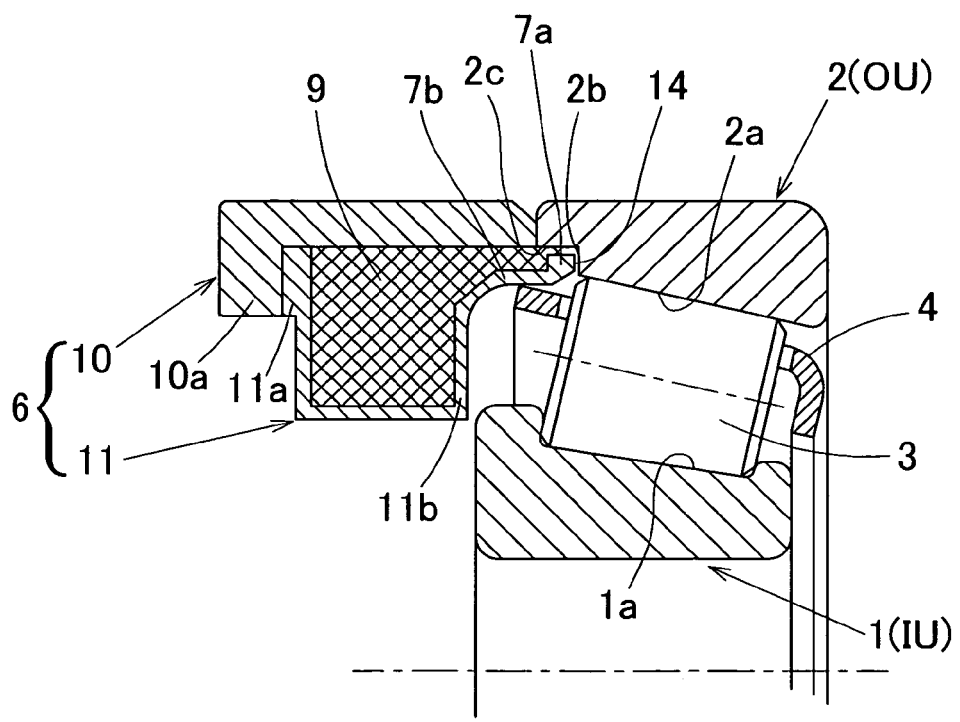
FIG. 6 is a fragmentary sectional view of the rolling bearing assembly according to a third preferred embodiment of the present invention.

FIG. 6 illustrates a third preferred embodiment of the present invention. This third embodiment is also similar to the first embodiment, but differs therefrom in that the grease reservoir forming component unit 6 and the associated structural elements all employed in the first embodiment shown in FIGS. 1 and 2 are applied to a tapered roller bearing assembly. The grease reservoir forming component unit 6 is provided in an areas proximate to the side where the axially extending outer ring raceway surface 2a of the outer ring 2 represents a larger diameter than that of the remaining portion thereof. Other structural features than those described above are similar to those employed in the first embodiment shown in and described with particular reference to FIGS. 1 and 2.

In the case of this embodiment, the base oil of the grease supplied from the grease reservoir 9 towards a large diameter side of the outer ring raceway surface 2a is assuredly guided towards an area between an inner ring large rib surface and a large end face of each of the rollers, in which slide unavoidably occurs and poses a problem in the tapered roller bearing assembly, and, therefore, the lubricity can be increased. In this way, the high speed feature, the long life and the maintenance-free can be enhanced. Even the tapered roller bearing assembly can be utilized in supporting the spindle of the machine tool spindle device in a manner similar to that shown and described in connection with the angular contact ball bearing in the first embodiment shown in FIGS. 1 and 2 to achieve the stabilized supply of the lubricant oil, the high speed feature, the long life and the maintenance-free.

Figure 7:
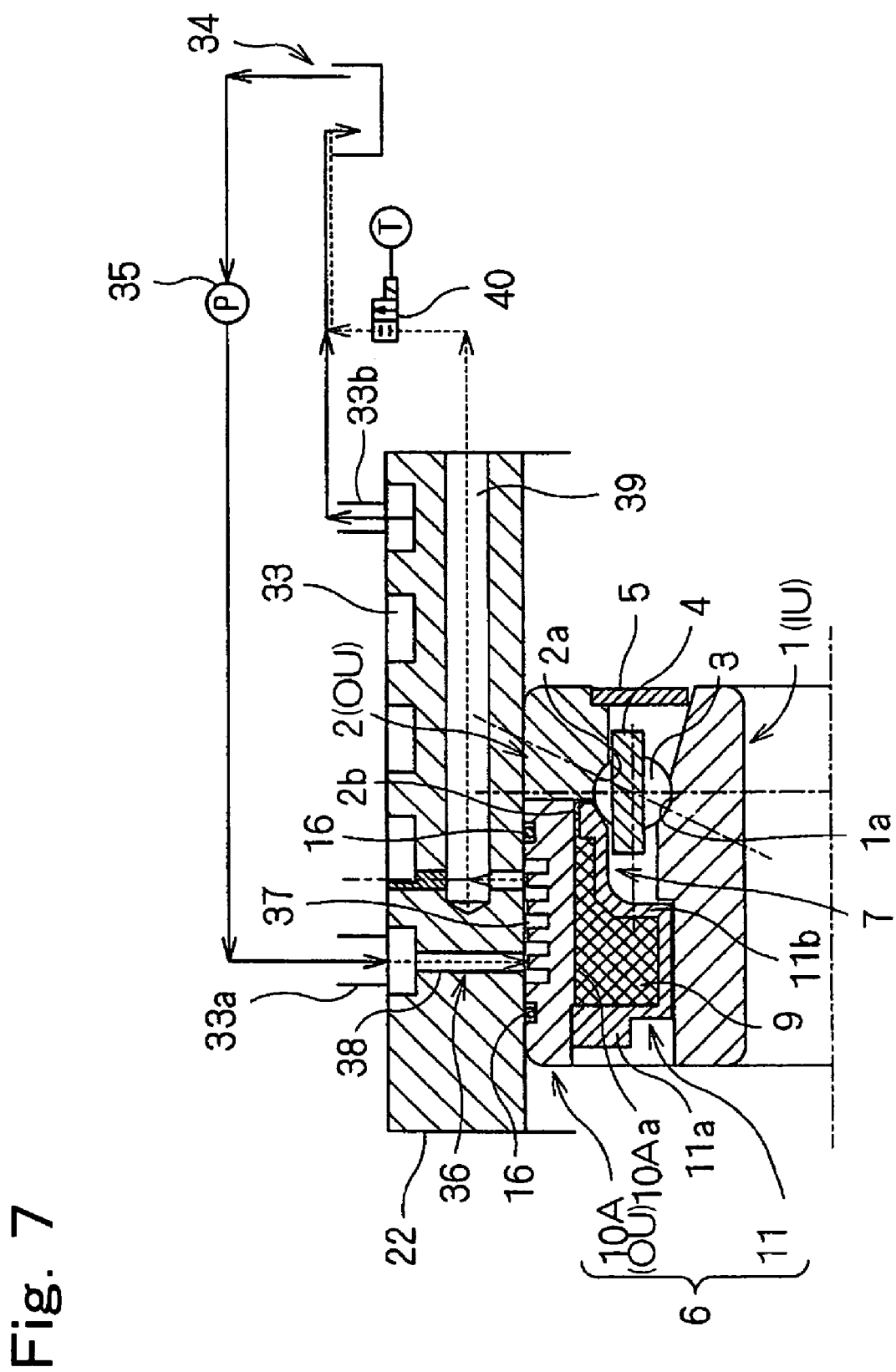
FIG. 7 is a fragmentary sectional view of the rolling bearing assembly according to a fourth preferred embodiment of the present invention.

A fourth preferred embodiment of the present invention will now be described with particular reference to FIGS. 7 and 8. In this embodiment, an example of the rolling bearing assembly incorporated in a spindle unit of the machine tool main shaft is shown. Referring to FIG. 7, this rolling bearing assembly includes the inner ring unit (IU) in the form of an inner ring 1, an outer ring 2 which is a member forming a part of the outer ring unit (OU), an outer ring positioning spacer 10A provided in contact with an end face on the front side, a plurality of rolling elements 3 interposed between respective raceway surfaces 1a and 2a formed in the inner and outer rings 1 and 2, a grease reservoir forming component unit 6 and a gap forming piece 7. The plural rolling elements are retained by a retainer 4, and one of opposite ends of an bearing space delimited between the inner and outer rings 1 and 2 are sealed by a sealing member 5. The sealing member 5 is effective to avoid a leakage of a grease, filled inside the bearing assembly, to the outside. This rolling bearing assembly shown therein is an angular contact ball bearing, in which the sealing member 5 is provided in an end on a rear side of the bearing assembly and the grease reservoir forming component unit 6 and the gap forming piece 7 are provided on a front side of the bearing assembly. On the front side of the bearing assembly, the grease reservoir forming component unit 6 concurrently serves as a sealing element effective to avoid a leakage of the grease from the front side of the bearing assembly. A portion of the figure shown by the cross hatching represents an area where the grease is filled. The inner ring 1 of the rolling bearing assembly is rotatably mounted on the spindle (not shown) whereas the outer ring 2 is fixedly supported inside an inner periphery of the housing 22 in the spindle unit.

The outer ring unit (OU), which forms a stationary raceway ring unit, has a stepped face 2b continued from the raceway surface 2a of the outer ring unit (OU) and in continuation with an edge portion of the raceway surface 2a on one side opposite to the direction, in which the contact angle occurs, that is, on an outer ring front side remote from the rolling elements 3. This stepped face 2b is a face extending radially outwardly from the raceway surface 2a so as to oppose to the outer ring front side. It is to be noted that although in this embodiment the stepped face 2b is shown as an end face on the front side, it may be of such a shape that an inner diametric face portion on the front side continue from the stepped face 2b.

The grease reservoir forming component unit 6 is a ring shaped component unit having a grease reservoir 9 formed therein and is provided in contact with an end face on the front side of the outer ring 2. In the instance as shown, the grease reservoir forming component unit 6 is made up of the outer ring positioning spacer 10A, which forms one of component parts forming the outer ring unit (OU), and a grease reservoir forming component body 11 of an outwardly oriented groove shape mounted on an inner diametric surface of the outer ring positioning spacer 10A. An interior space delimited between the outer ring positioning spacer 10A and the grease reservoir forming component body 11 forms the grease reservoir 9.

A sealing member (not shown) is interposed between an outer diametric surface of a side wall portion 11a of the grease reservoir forming component body 11 and an inner diametric surface of the outer ring positioning spacer 10A, which confronts the outer diametric surface of the side wall portion 11a. Alternatively, the grease reservoir forming component body 11 and the outer ring positioning spacer 10A are bonded together by the use of a bonding agent. Another sealing member (also not shown) is interposed between respective mating faces of the outer ring positioning spacer 10A and the outer ring 2. Prevention of a grease leakage is accomplished by those sealing members.

Figure 8:
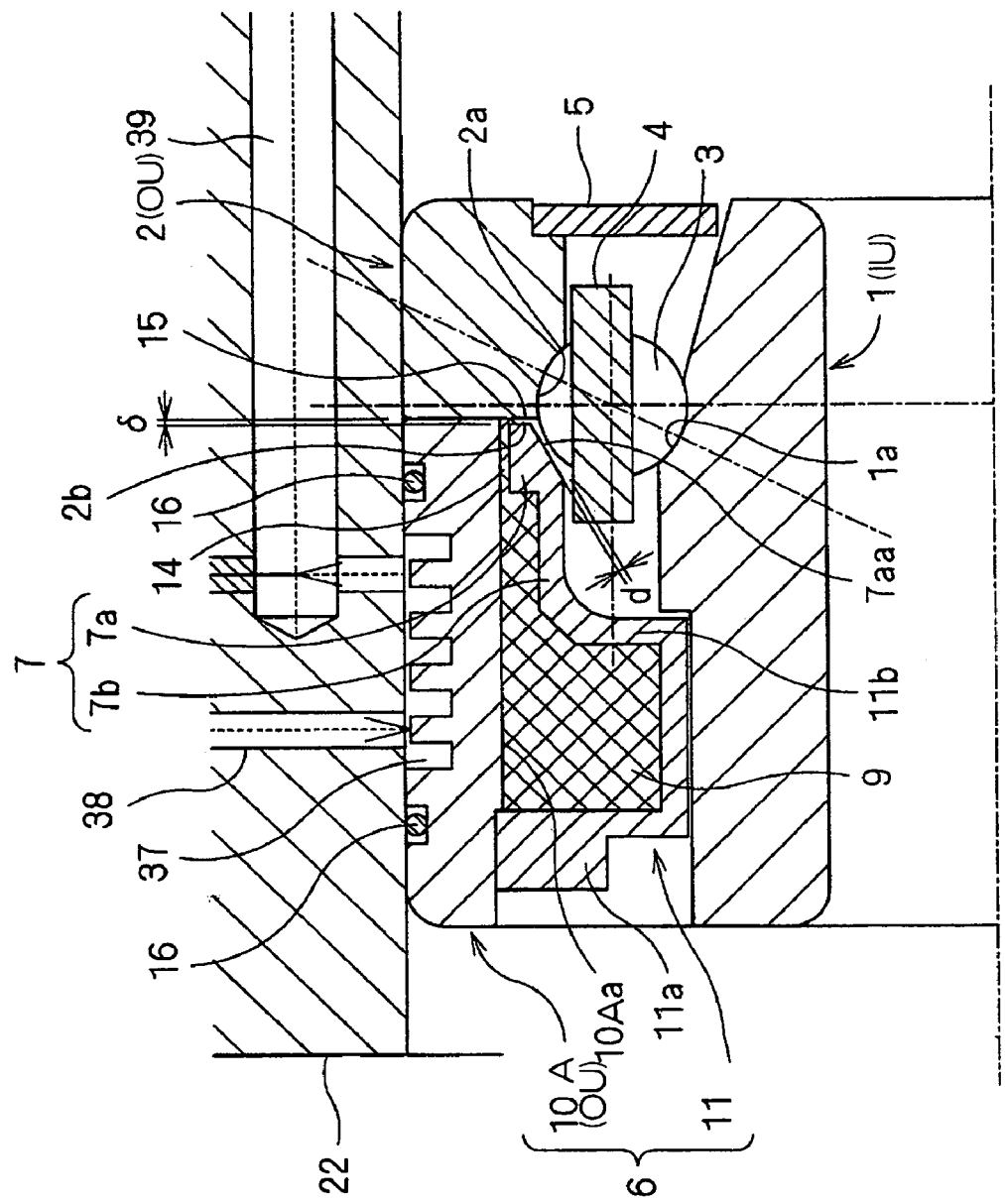
FIG. 8 is a fragmentary enlarged sectional view of that portion of the rolling bearing assembly shown in FIG. 7.

The gap forming piece 7 is a ring shaped member disposed along the inner diametric surface 10Aa of the outer ring positioning spacer 10A, with its free end confronting the stepped face 2b, to thereby form a flow passage 14 and a gap 15 between the gap forming piece 7 and the outer ring positioning spacer 10A as shown on an enlarged scale in FIG. 8. This gap forming piece 7 is formed integrally with the grease reservoir component body 11. In other words, it extends integrally from an outer diametric end portion of the grease reservoir forming component body 11 adjacent the side wall portion 11b on one side adjacent the bearing.

Specifically, a peripheral wall of the free end 7a of the gap forming piece 7 and the inner diametric surface 10Aa of the outer ring positioning spacer 10A cooperatively define therebetween the flow passage 14 referred to above. The gap forming piece 7 has its free end 7a extending to a position proximate to the stepped face 2b of the outer ring 2 with the minute gap 15 of a gap size δ defined between an end face of the free end 7a of the gap forming piece and the outer ring stepped face 2b to which the free end 7a confronts. This minute gap 15 is communicated with the flow passage 14 and opens at an edge portion of the outer ring raceway surface 2a. The gap size δ of the minute gap 15 is chosen to be within the range of 0.05 to 0.1 mm.

An inner diametric surface of the gap forming piece free end 7a that continues from the end face thereof is rendered to be a tapered face 7aa held in proximity to the rolling elements 3 to permit a lubricant oil to be readily pooled between the tapered face 7aa and the rolling elements 3. The tapered face 7aa and the rolling elements 3 are spaced a distance d from each other, which distance d is preferably of a value enough to define an extremely minute gap sufficient to allow the oil, then deposited to the tapered face 7aa, to be transferred to a surface of each of the rolling elements 3 and is so chosen as to be 0.2 mm or smaller. A base portion 7b of the gap forming piece 7 is designed to be of a diameter smaller than that of the free end 7a. An area delimited between an outer diametric surface of the base portion 7b and the inner diametric surface 10Aa of the outer ring positioning spacer 10A forms a portion of the grease reservoir 9 that is communicated with the flow passage 14.

The housing 22 fixedly supporting the outer ring 2 of the rolling bearing assembly is provided with a spirally extending passage 33 for the flow of a cooling liquid. The cooling liquid passage 33 has an inlet 33a to which the cooling liquid is supplied from a cooling liquid recovery and cooling device 34, shown in FIG. 7, through a supply circuit having a pump 35 disposed therein. The cooling liquid used to cool the housing 22 is returned from an outlet 33b of the cooling liquid passage 33 to the cooling liquid recovery and cooling device 34 through a recovery circuit in readiness for the subsequent recirculation into the cooling fluid passage 33.

Similarly, the outer ring positioning spacer 10A has an outer periphery provided with a spirally extending passage 37 for the flow of the cooling liquid, to which a portion of the cooling liquid supplied to the cooling liquid passage inlet 33a is supplied through a cooling liquid inlet 38 that is branched off from the inlet 33a of the cooling liquid passage 33 referred to above. A sealing member 16 such as, for example, an O-ring is interposed between the inner peripheral surface of the housing 22 and the outer peripheral surface of the outer ring positioning spacer 10A positioned on axially opposite sides of a region where the cooling liquid passage 37 is defined, thereby preventing a leakage of the cooling liquid. In addition, the housing 22 is provided with a cooling liquid outlet 39 through which the cooling liquid having flown through the cooling liquid passage 37 is returned to the cooling liquid recovery and cooling device 34, and the cooling liquid emerging outwardly from the cooling liquid outlet 39 is returned to the cooling liquid recovery and cooling device 34 through a recovery circuit having an electromagnetic valve 40 disposed therein. Thus, the cooling liquid passage 37, the cooling liquid inlet 38, the cooling liquid outlet 39 and the electromagnetic valve 40 form a grease reservoir cooling liquid recirculating passage 36 through which a portion of the cooling liquid used to cool the housing 22 can be recirculated around the grease reservoir 9. This grease reservoir cooling liquid recirculating passage 36 is so designed and so configured as to provide a heat cycle in which the temperature of the grease reservoir 9 can be alternately ascended and descended by controlling opening and closing of the electromagnetic valve 40. This heat cycle occurs at intervals of preferably 30 minutes to 50 hours and more preferably 2 to 10 hours.

The operation of the structure described above will now be described. At the time of assemblage of the bearing assembly, a quantity of grease is filled in the grease reservoir 9 and the flow passage 14. Also, the grease is appropriately applied to the bearing raceway surfaces as an oil for initial lubrication.

When the machine tool is operated, the grease pooled within the grease reservoir 9, that is sealed except at the gap 14, is subjected, at a time immediately after the operation of the machine tool, to separation between a base oil and a thickening agent, both of which are contents of the grease and have different coefficients of thermal expansion, as a result of temperature rise during the operation of the bearing assembly. Simultaneously therewith, an internal pressure of the sealed grease reservoir 9 increases. By the effect of this internal pressure, the base oil separated from the thickening agent is discharged from the gap 14 towards the raceway surface 2a of the outer ring 2. When the temperature being raised attains a steady state, a decisive factor that has caused the ascent of the internal pressure diminishes and, therefore, the internal pressure gradually decreases as the base oil is so discharged, accompanied by a reduction in amount of the base oil discharged per unit time.

When at this time the electromagnetic valve 40 in the grease reservoir cooling liquid recirculating passage 36 is opened, the cooling liquid recirculates from the cooling liquid inlet 38 back to the cooling liquid inlet 38 through the cooling liquid passage 37, then through the cooling liquid outlet 39 and finally through the cooling liquid recovery and cooling device 34 by way of the pump 35, with the outer ring positioning spacer 10A cooled consequently. In this way, the temperature of and the pressure within the grease reservoir 9 decrease abruptly, accompanied by a reduction of the amount of the base oil discharged per unit time.

When the electromagnetic valve 40 is subsequently closed to interrupt the flow of the cooling liquid through the spirally extending cooling liquid passage 37, the temperature of the grease reservoir 9 ascends and, through a mechanism similar to that described above, the base oil is again discharged onto the outer ring raceway surface 2a. Thereafter, by the effect of the heat cycle accompanied by the cyclic ascent and descend of the temperature in the manner described above, a variation in pressure within the grease reservoir 9 is repeated and the base oil separated from the grease is assuredly transferred to the gap 14 so that the base oil can be repeatedly supplied to the raceway surface 2a of the outer ring 2.

Also, in this embodiment described hereinabove, since the gap 15 is so designed as to have a gap size δ within the range of 0.05 to 0.1 mm, a practically sufficient amount of the base oil discharged can be obtained. This gap size δ is indeed appropriate, considering the workability of the practice involving the processing of the gap 15 and the adjustment of the gap.

Additionally to the base oil discharge caused by the heat cycle as described above, a similar base oil discharge occurs by the effect of a capillary phenomenon which will be described subsequently. Specifically, at the time bearing assembly is out of operation, the base oil of the grease moves from the flow passage 14 towards the gap 15, by the effect of the thickening agent and the capillary phenomenon taking place within the gap 15 and the base oil so supplied into the gap 15 in the manner described above is retained in an oil form within the gap 15 by the effect of the capillary phenomenon and the surface tension of the oil. When the bearing assembly is operated, the base oil pooled within the gap 15 is discharged from the gap 15 by the effect of a volumetric expansion caused by an increase of the temperature of the outer ring 2, brought about by the operation, and an airflow induced by revolution and rotation of the rolling elements 3, finally depositing on the raceway surface 2a of the outer ring, whereby the base oil deposited on the raceway surface 2 can be continuously transferred onto the rolling elements then held in rolling contact with the raceway surface 2a.

As hereinabove described, in the rolling bearing assembly of the present invention, as the cooling liquid flowing through the grease reservoir cooling liquid recirculating passage 36 brings about the heat cycle, accompanied by the cyclic ascent and descent of the temperature within the grease reservoir 9, whereby the base oil separated from the grease can be repeatedly discharged onto the raceway surface 2a of the outer ring 2 through the gap 15 and, therefore, the supply of the lubricant oil takes place assuredly. In addition, since the base oil can be discharged to the raceway surface 2a of the outer ring 2 also by the capillary phenomenon taking place within the gap 15 in the manner as hereinabove described, the lubricant can be supplied further assuredly. In view of this, only the grease filled within the bearing assembly is utilized to achieve a high speed feature, a long life, a maintenance-free and a stabilized supply of the lubricant oil.

In the case of this embodiment, since the rolling bearing assembly is shown as employed in the form of the angular contact ball bearing, when the stepped face 2b in the outer ring 2 is provided on one side opposite to the direction in which the contact angle occurs, the stepped face 2b can easily be arranged immediately below the rolling elements 3. Since the stepped face 2b can be positioned in proximity to the center of each of the rolling elements 3, supply of the lubricant oil from the stepped face 2b to the outer ring raceway surface 2a can be accomplished efficiently.

It is to be noted that although in order to apply the heat cycle to the grease reservoir 9, the use of a cooling liquid supply apparatus including, for example, the cooling liquid recovery and cooling device 34, the pump 35 and others is required, it can concurrently serves as a cooling liquid supply apparatus for cooling the housing 22. Accordingly, complication of the structure can be avoided, allowing the structure to be assembled at a low cost. For driving the spindle employed in machine tools currently in use these days, a built-in motor is employed in most cases, resulting in heat evolution. Because of this, a spiral groove for cooling is provided in a motor housing and a bearing outer peripheral portion so that cooling can be accomplished through a cooling liquid flowing therethrough (a so-called outer tube cooling). In view of this, by providing an outer diametric side of the grease reservoir 9 with the cooling liquid passage 37 in the form of a similar spiral groove so that the cooling liquid for cooling the housing or the like can be passed therethrough, it can readily be accomplished to lower the temperature of the grease reservoir 9, which is once increased as a result of operation of the machine tool, to thereby apply the heat cycle.

Figure 9:
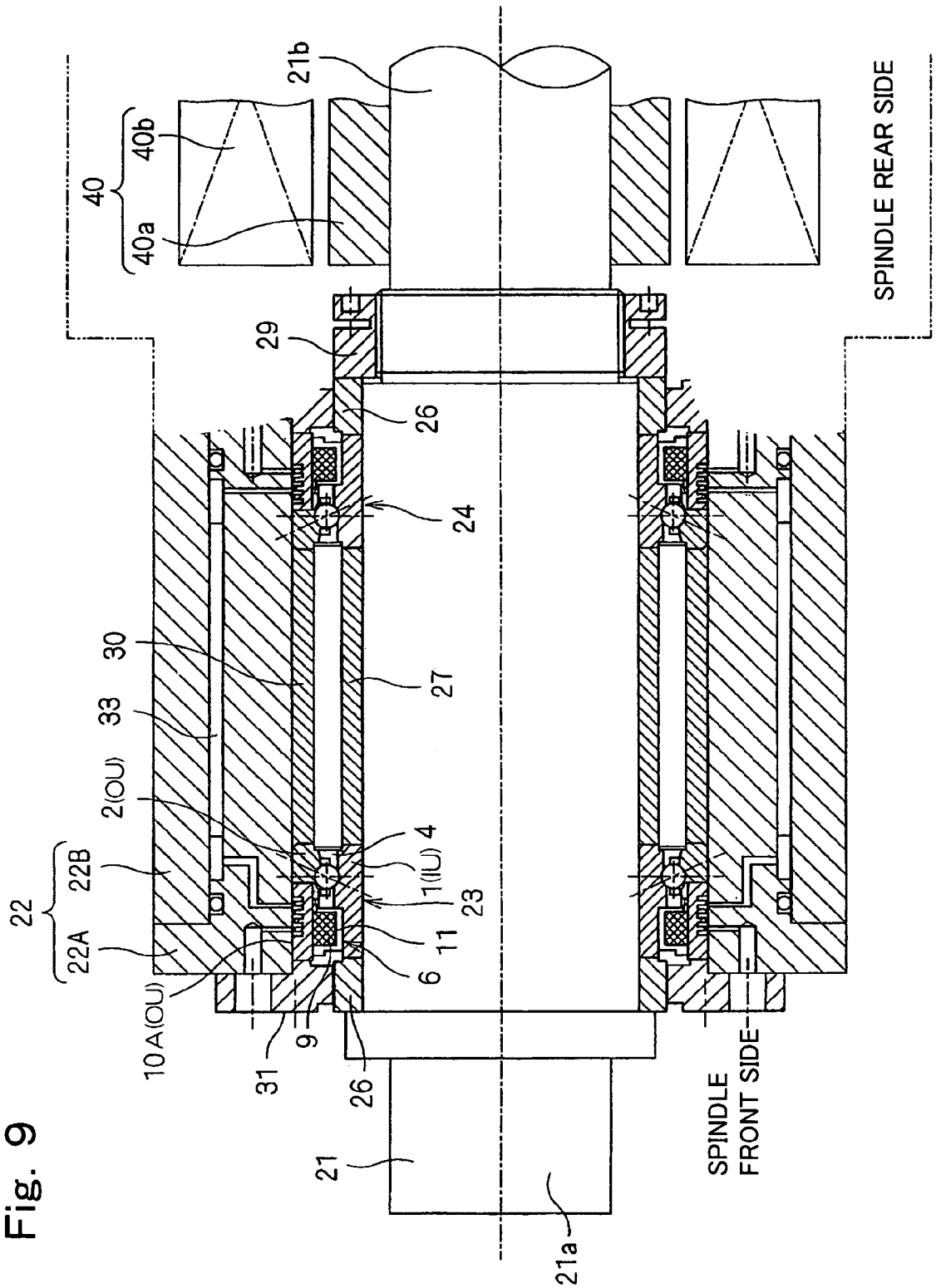
FIG. 9 is a longitudinal sectional view of the machine tool spindle device utilizing the rolling bearing assemblies shown in FIG. 7.

FIG. 9 illustrates an example of a machine tool spindle device utilizing the rolling bearing assembly according to the fourth embodiment described hereinabove. In the illustrated machine tool spindle device, the two rolling bearing assemblies are employed in back-to-back relation to each other. Those rolling bearing assemblies 23 and 24 are used to rotatably support a spindle 21 at opposite ends thereof within a housing 22. Each of the rolling bearing assemblies 23 and 24 has an inner ring 1 positioned intermediate between an inner ring positioning spacer 26 and an inner ring spacer 27 and is held in position on the spindle 21 by means of an inner ring fastening nut 29. An outer ring 2 of each of the rolling bearing assemblies 23 and 24 is fixedly positioned by means of an outer ring positioning spacer 10, an outer ring spacer 30 and outer ring retaining lid 31. The housing 22 is made up of a housing inner tube 22A and a housing outer tube 22B mounted on the housing inner tube 22A with an oil flow groove 33 defined therebetween for cooling purpose.

The spindle 21 has a front end 21a provided with a chuck (not shown) to which a tool or work (both not shown) can be detachably fitted, and a rear end 21b provided with a rotor 40a of a motor 40. The motor 40 is built in the housing 22 and is made up of the rotor 40a and a stator 40b such as, for example, a coil disposed within the housing 22. It is to be noted that the motor 40 may be drivingly coupled with the spindle 21 through a drive transmission mechanism (not shown) installed outside the housing 22. This spindle device can be applied to any type of machine tools such as, for example, a machining center, lather, milling cutter, grinding machine and so on.

According to the spindle device of the structure described above, functions including a stabilized supply of the lubricant oil to the rolling bearing assemblies 23 and 24 according to this embodiment, high speed feature, increased life and maintenance-free can be exhibited effectively.

Figure 10:
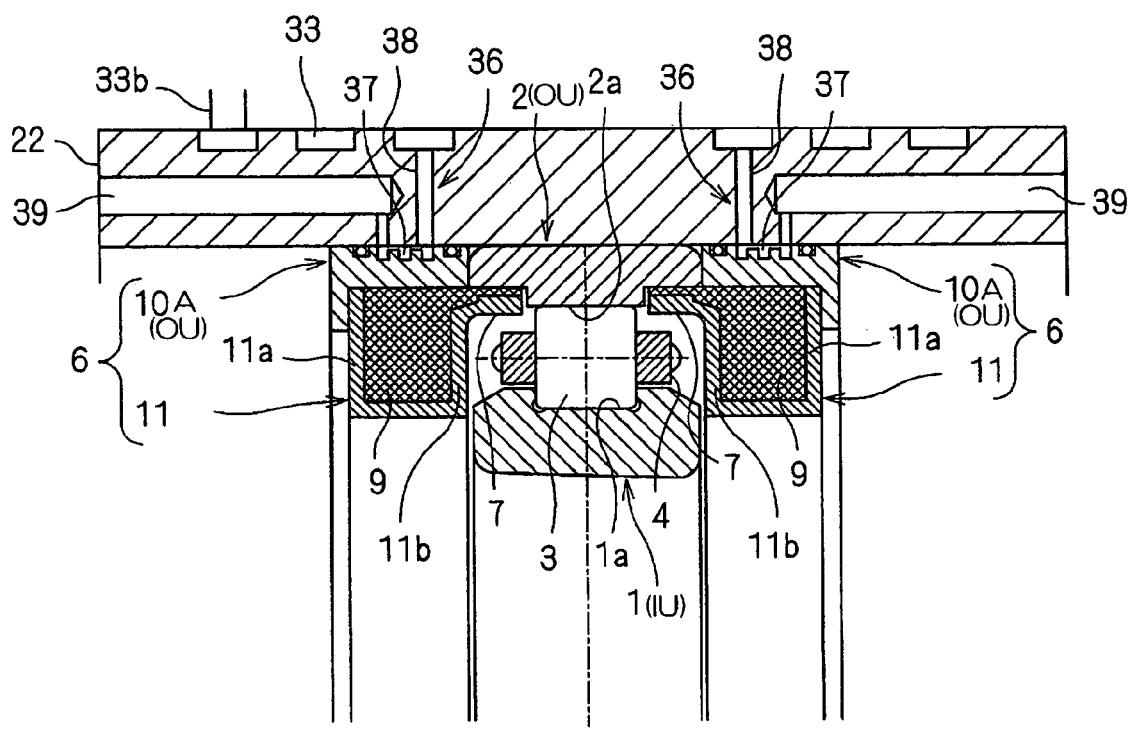
FIG. 10 is a fragmentary sectional view showing the rolling bearing assembly according to a fifth preferred embodiment of the present invention.

FIG. 10 illustrates a fifth preferred embodiment of the present invention. This fifth embodiment is similar to the fourth embodiment shown in and described with reference to FIGS. 7 and 8, but differs therefrom in that the grease reservoir forming component unit 6 and the associated structural elements all employed in the fourth embodiment are applied to a cylindrical roller bearing assembly. The grease reservoir forming component unit 6 is provided in respective areas proximate to opposite ends of the outer ring 2. Other structural features than those described above are similar to those employed in the fourth embodiment shown in and described with particular reference to FIGS. 7 and 8.

In the case of this fifth embodiment, the base oil of the grease can be supplied to the outer ring raceway surface 2a from the grease reservoir 9 defined on each side thereof. In the case of the cylindrical roller bearing assembly, since each of rollers forming the rolling elements 3 has a certain length, supply of the base oil of the grease from opposite sides is desirable in terms of increase in lubricity since the base oil can be supplied axially with no bias or irregularity in supply. Accordingly, a high speed feature, a long life and a maintenance-free can be enhanced. Even the cylindrical roller bearing assembly can be utilized in supporting the spindle of the machine tool spindle device in a manner similar to that shown and described in connection with the angular contact ball bearing in the fourth embodiment shown in FIGS. 7 and 8 to achieve the stabilized supply of the lubricant oil, the high speed feature, the long life and the maintenance-free.

Figure 11:
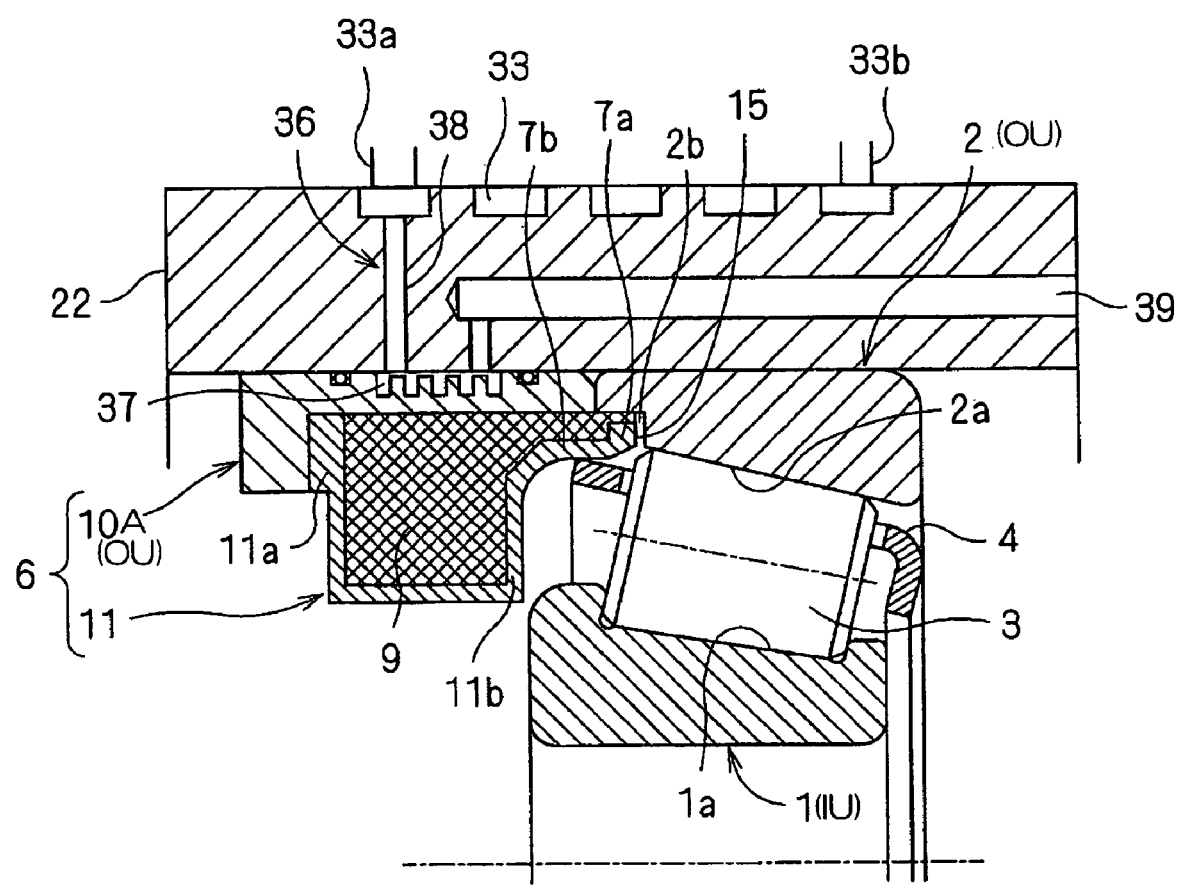
FIG. 11 is a fragmentary sectional view showing the rolling bearing assembly according to a sixth preferred embodiment of the present invention.

FIG. 11 illustrates a sixth preferred embodiment of the present invention. This sixth embodiment is also similar to the fourth embodiment shown in and described with reference to FIGS. 7 and 8, but differs therefrom in that the grease reservoir forming component unit 6 and the associated structural elements all employed in the fourth embodiment are applied to a tapered roller bearing assembly. The grease reservoir forming component unit 6 is provided in an area proximate to the side where the axially extending outer ring raceway surface 2a of the outer ring 2 represents a larger diameter than that of the remaining portion thereof. Other structural features than those described above are similar to those employed in the fourth embodiment shown in and described with particular reference to FIGS. 7 and 8.

In the case of this embodiment, the base oil of the grease supplied from the grease reservoir 9 towards a large diameter side of the outer ring raceway surface 2a is assuredly guided towards an area between an inner ring large rib surface and a large end face of each of the rollers, in which slide unavoidably occurs and poses a problem in the tapered roller bearing assembly, and, therefore, the lubricity can be increased. In this way, the high speed feature, the long life and the maintenance-free can be enhanced. Even the tapered roller bearing assembly can be utilized in supporting the spindle of the machine tool spindle device in a manner similar to that shown and described in connection with the angular contact ball bearing in the fourth embodiment shown in and described with reference to FIGS. 7 and 8 to achieve the stabilized supply of the lubricant oil, the high speed feature, the long life and the maintenance-free.

What is claimed is:
1. A rolling bearing assembly comprising:
an inner ring unit forming a raceway ring unit;
an outer ring unit forming another raceway ring unit;
a plurality of rolling elements interposed between respective raceway surfaces of the inner and outer ring units;

a stepped face continued from the raceway surface in a direction away from the rolling elements is provided in one of the inner ring unit and the outer ring unit that serves as a stationary raceway ring unit;

a gap forming piece having a free end confronting the stepped face to define a gap therebetween, the gap forming piece including a peripheral wall cooperating with the stationary raceway ring unit to define a flow passage therebetween; and a grease reservoir communicated with the flow passage and subjected to a heat cycle of ascent and descent of a temperature.

2. The rolling bearing assembly as claimed in claim 1, wherein the gap between the stepped face and the gap forming piece is selected to be within the range of 0.05 to 0.1 mm.

3. The rolling bearing assembly as claimed in claim 1, further comprising a grease reservoir cooling liquid recirculating passage, through which a cooling liquid for cooling a member in contact with the stationary raceway ring unit is recirculated around the grease reservoir, wherein the heat cycle of ascent and descent of the temperature is applied to the grease reservoir generated by a time-dependent change of an amount of the cooling liquid flowing through the grease reservoir cooling liquid recirculating passage.

4. The rolling bearing assembly as defined in claim 3, wherein the stationary raceway ring unit is the outer ring unit and the member in contact with the stationary raceway ring unit is a housing accommodating the outer ring.

5. The rolling bearing assembly as claimed in claim 1, wherein the rolling bearing assembly is an angular contact ball bearing for supporting a machine tool spindle.

6. The rolling bearing assembly as claimed in claim 1, wherein the rolling bearing assembly is a cylindrical roller bearing for supporting a machine tool spindle.

7. The rolling bearing assembly as claimed in claim 1, wherein the rolling bearing assembly is a tapered roller bearing for supporting a machine tool spindle.

8. A method of lubricating a rolling bearing assembly that includes an inner ring unit forming a raceway ring unit; an outer ring unit forming another raceway ring unit; a plurality of rolling elements interposed between respective raceway surfaces of the inner and outer ring units; a stepped face continued from the raceway surface and provided in one of the inner ring unit and the outer ring unit that serves as a stationary raceway ring unit, in a direction away from the rolling elements; a gap forming piece having a free end confronting the stepped face to define a gap therebetween selected to be within the range of 0.05 to 0.1 mm, the gap forming piece including a peripheral wall cooperating with the stationary raceway ring unit to define a flow passage therebetween; and a grease reservoir communicated with the flow passage, the method comprising:

filling grease in the grease reservoir and the flow passage formed between the stepped face in the stationary raceway ring unit and the gap forming piece, the grease comprising a base oil and a thickening agent, the base oil and the thickening agent having different coefficients of thermal expansion; and operating the roller bearing assembly under an environment in which a heat cycle of ascent and descent of a temperature is applied to the grease reservoir, wherein when the temperature of the grease reservoir increases as the bearing assembly is operated, due to the difference in coefficient of expansion between the thickening agent and the base oil within the sealed grease reservoir, the base oil is separated from the thickening agent, and by the effect of a variation in pressure within the grease reservoir resulting from the heat cycle of ascent and descend of the temperature of the grease reservoir, the base oil separated from the thickening agent is transferred to the gap and then purged towards the stationary raceway surface.

* * * * *